Nov. 23, 1965 P. C. JACOBS 3,218,722
GAGE FOR MEASURING THE FLANGE HEIGHT OF STRUCTURAL SHAPES
Filed Jan. 29, 1964 2 Sheets-Sheet 1
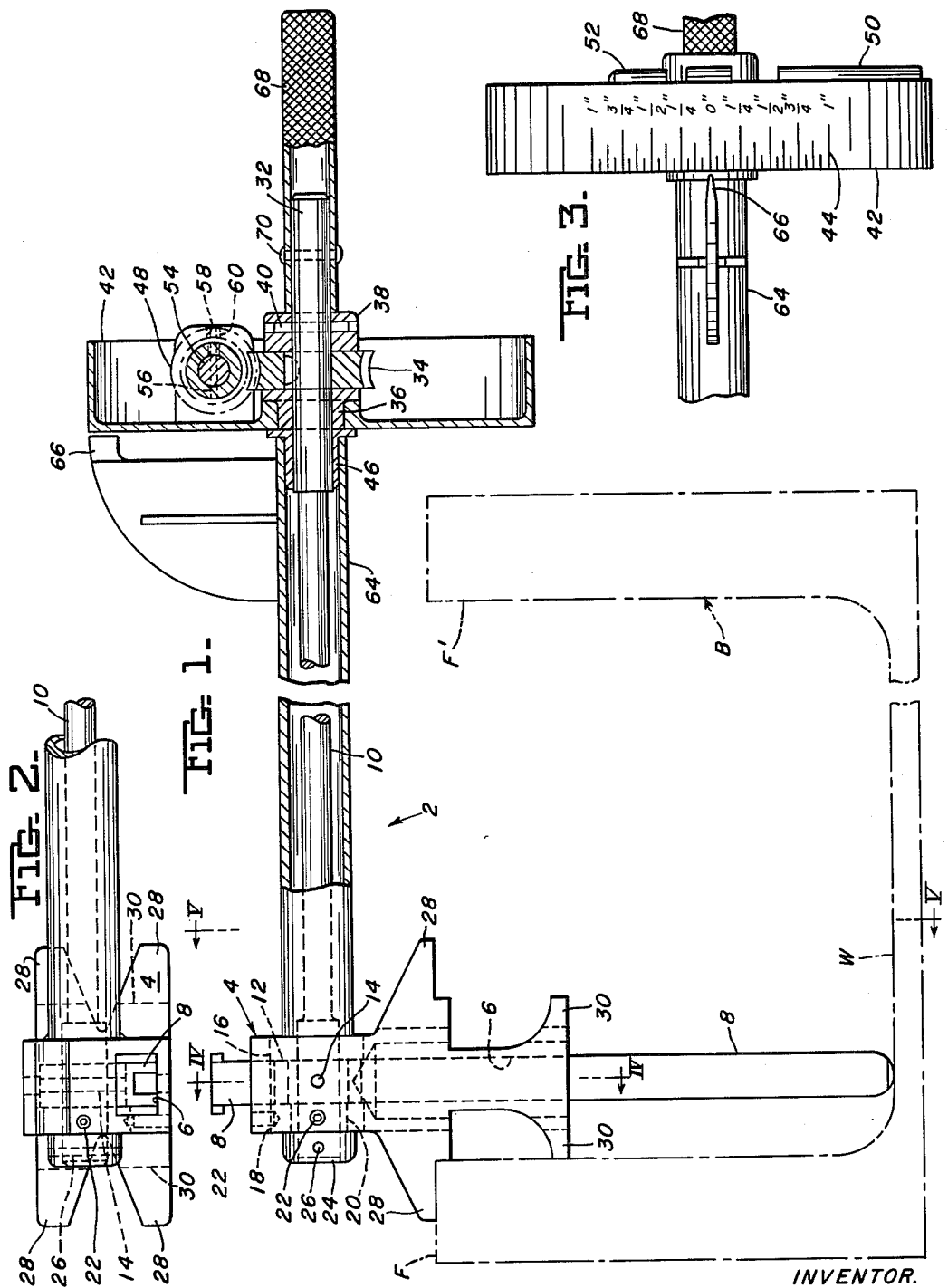
INVENTOR.
PERCY C. JACOBS
By Donald G. Dalton
Attorney Nov. 23, 1965   P. C. JACOBS   3,218,722
GAGE FOR MEASURING THE FLANGE HEIGHT OF STRUCTURAL SHAPES
Filed Jan. 29, 1964   2 Sheets-Sheet 2
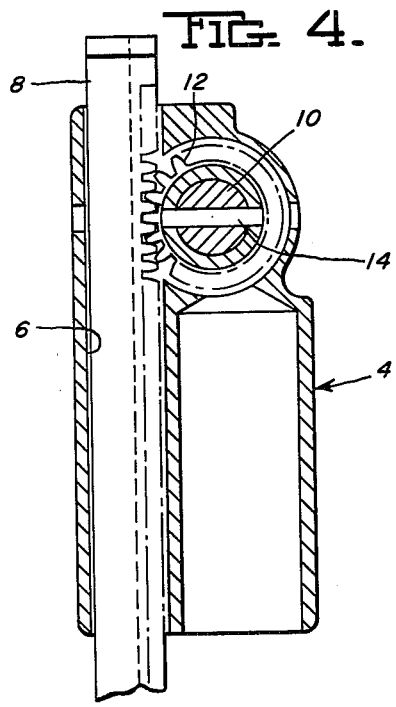
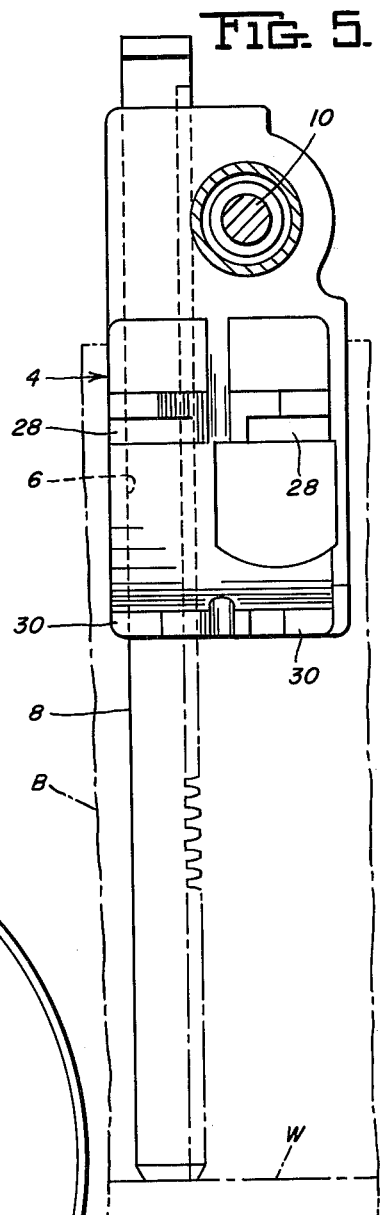
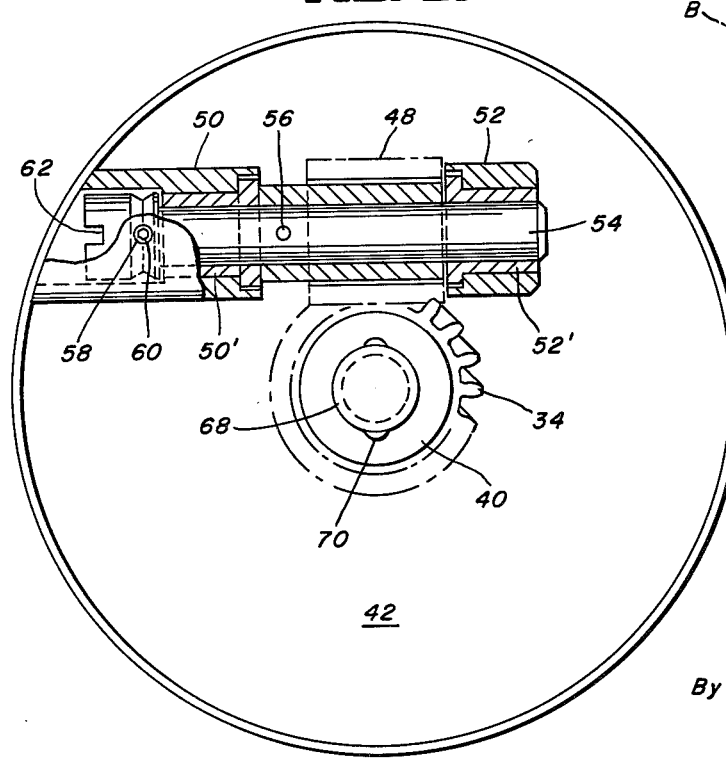
INVENTOR.
PERCY C. JACOBS
By Donald G. Dalton
Attorney 3,218,722
GAGE FOR MEASURING THE FLANGE HEIGHT
OF STRUCTURAL SHAPES
Percy C. Jacobs, Clearwater, Fla., assignor to United
States Steel Corporation, a corporation of New Jersey
Filed Jan. 29, 1964, Ser. No. 340,866
2 Claims. (Cl. 33—172)

The present invention relates generally to devices for measuring linear dimensions and, more particularly, to an improved gage of the dial type especially suitable for determining the height of a flange of a structural shape such as an H-beam, channel section, or the like.

During the hot rolling of structural shapes or beams, it is necessary to ascertain at intervals whether the rolling mill is in proper adjustment and is producing structural beams of the desired size and shape. Checking the flange height of the beam is one of the measurements made in ascertaining if the mill is "on section" and producing good product. This measurement, which is a determination of the distance between the upper edge of the flange and the web of the beam, must obviously be made after the beam leaves the last rolling pass. Prior to my invention, this distance was determined by cutting off a portion of a beam after it had emerged from the last stand of the mill, setting it aside to cool, and then after the cut portion had cooled sufficiently, making the flange measurement with a conventional measuring tool.

The method just described was excessively time consuming and wasteful. During the time the cut portion was cooling so that it coud be measured, a considerable amount of tonnage would be produced by the rolling mill before it could be determined whether or not the mill was in proper adjustment. Consequently, if the mill was not in proper adjustment, much of the tonnage produced while waiting for the cut sample to cool would have to be scrapped.

Accordingly, it is the primary object of my invention to provide a gage for determining the height of a flange of a structural beam whereby the determination can be made while the beam is still at elevated temperature.

It is another object of my invention to provide a gage of the character described which will quickly and efficiently indicate variance from a predetermined flange height.

It is a further object of my invention to provide a gage of the character described which is inexpensive to manufacture, is simple and rugged in construction, and is easy to operate.

These and other objects will become more apparent after referring to the following specification and attached drawings, in which:

FIGURE 1 is a side elevational view partly in section;

FIGURE 2 is a partial plan view of the left side of FIGURE 1;

FIGURE 3 is a plan view similar to FIGURE 2 but of the right side of FIGURE 1;

FIGURE 4 is an enlarged vertical sectional view taken along the line IV—IV of FIGURE 1;

FIGURE 5 is an enlarged vertical sectional view taken along the line V—V of FIGURE 1; and FIGURE 6 is an end view of the dial wheel assembly of the invention partly in section looking to the left of FIGURE 1.

Referring more particularly to the drawings, reference numeral 2 designates generally the gage of my invention which is illustrated, in FIGURE 1, being used to measure the height of a flange F of an H-beam B having a web W. The gage 2 includes a head 4 having a longitudinal opening 6 therethrough for accommodating a rack bar 8 which fits slidably in the head. A shaft 10 is rotatably fitted by one end in the head 4 at the upper end thereof, as best shown in FIGURE 1, adjacent the opening 6. The shaft 10 extends laterally outwardly of the head generally normal to the rack bar 8. A pinion 12 is rigidly mounted on the shaft 10 within the head 4 by means of a pin 14 which extends through the pinion and the shaft. A bearing 16 is circumferentially mounted on the shaft 10 adjacent the pinion 12, and a collar 18 having a bearing 20 fitted therein is mounted on the shaft 10 on the opposite side of the pinion 12. The collar is fixed against rotation in the head by means of set screws 22. A cap 24 is mounted on the projecting end of the shaft 10 by means of a pin 26.

The head 4 is provided with a pair of laterally-extending spaced bearing surfaces or shoulders 28 on opposite sides for bearing against the upper edge of the flange F, as shown in FIGURE 1. The bearing surfaces 28 extend normal to rack bar 8 and parallel with the plane containing the shaft 10. An additional shoulder 30 is provided below each of the shoulders 28 for contacting the inner surface of the flange F so as to insure proper positioning of the gage during use. Shoulders 28 and 30 are provided on both sides of the head 4 so as to enable the gage of the invention to be used for determining the height of both flanges of an H-beam, channel section, etc. from one side of the structural shape, as will become apparent hereinafter. Preferably, the shoulders 28 and 30 are bifurcated to reduce the weight of the head 4.

The end of shaft 10 remote from head 4 is enlarged, as at 32, to accommodate a worm gear 34 which is keyed to the enlarged portion 32 between a bushing 36 and a collar 38, the latter being fixed to the shaft 10 by means of a pin 40.

A wheel 42 having calibration markings 44 on its periphery is mounted for rotation with shaft 10 when measuring the height of a flange, or around shaft 10 when setting calibrations on wheel 42 to zero as will be more fully explained hereinafter. A bearing 46 is fitted around the shaft 10 adjacent the wheel. A worm 48 in mesh with worm gear 34 is rotatably mounted on the wheel 42 between a pair of bearing blocks 50 and 52. The worm is fixedly mounted by means of a pin 56 on a stub shaft 54 which has its ends journaled in the bearing blocks 50 and 52. Bushings 50' and 52' are circumferentially disposed around the portions of the stub shaft 54 in the bearing blocks 50 and 52, respectively. The bearing block 50 is tapped and threaded, as at 58, to accomodate a set screw 60, for a purpose which will be explained more fully hereinafter. One end of the shaft 54 is slotted, as at 62, so that it can be turned to rotate the worm in adjusting the wheel.

A holding tube 64 extends from the bearing 46 to a welded connection with the head 4 so that the holding tube 64 is fixed against rotation relative to the shaft 10. A quarter segment plate 66 is welded in upright position on the holding tube 64 adjacent the wheel 42 to serve as an indicating pointer for the calibrations 44 on the outer periphery of the wheel 42. The calibrations on the wheel 42, as shown in FIGURE 3, may be 1/16" graduations extending in opposite directions from a center zero marking.

A handle 68 is fitted over the end of the shaft 10 adjacent the wheel 42 and is connected with the shaft by means of a pin 70.

The dial wheel assembly of the apparatus of the invention is several feet away from the head 4 so that the gage can be used to check the flange of a structural beam while the beam is at an elevated temperature.

In operation, the rack bar 8 is adjusted in the head 4 so that the distance from the bottoms of the shoulders 28 and the bottom of the rack bar is equal to the desired flange height. With the rack bar thus adjusted, the wheel 42 is turned to zero position by loosening the set screw 60 and turning the stub shaft 54. After the wheel has been set in zero position, the set screw 60 is tightened in the hole 58 so as to fix the shaft 54 against rotation. After the gage has thus been set, it is positioned with the shoulder 28 on one side of the head resting on the upper edge of the flange F to be measured, and the shoulder 30 on the same side of the head resting against the inner surface of the flange. In handling the gage, the workman grasps it with one hand around the holding tube 64 adjacent the edge of the segment plate 66 toward the head 4, and the other hand around the handle 68. After the gage has been adjusted and set in position as described above, the workman loosens his grip on the handle 68 so that it can rotate with the shaft 10. If there is a discrepancy between the height of the flange and the preset distance between the shoulder 28 and the bottom end of the rack bar 8, the rack bar will move up or down in the head 4 causing the pinion 12 and shaft 10 to rotate. If the flange is higher than desired, the rack bar will slide downwardly by gravity through the head 4 causing the shaft 10 to be rotated by the pinion 12. When the shaft 10 is thus rotated, it causes rotation of the worm gear 34 which is in mesh with the worm 48. Since the worm 48 and shaft 54 are fixed against rotation by means of the set screw 60, rotation of the worm gear 34 causes rotation of the wheel 42 with and at the same rate as the rotation of shaft 10. The distance that the rack bar 8 moved relative to the head 4 will be indicated by the position of the wheel 42 relative to the pointer 66. Thus, the difference between the flange height desired and actual flange height is determined quickly by reading the marking on the wheel opposite the pointer. If the flange height is lower than that desired, the rack bar 8 will be moved upwardly through the head 4 from its preset position; and this will cause movement of the wheel from its zero position in the manner described above.

The opposite flange F' of the beam B can be measured by the workman in the manner described above without the necessity of the workman moving from his original position. The workman merely sets the rack bar 8 in the head 4 to its original preset position by adjusting the wheel 42 to zero position through rotation of shaft 10, by means of handle 68, and then positioning the gage with the shoulders 28 and 30 on the right side of the head 4 resting in engagement with the upper edge and inner surface, respectively, of the flange F'; and then proceeding as described above.

While one embodiment of my invention has been shown and described, it will be apparent that other adaptations and modifications may be made without departing from the scope of the following claims.

I claim:

1. A gage for determining the height of a flange of a structural shape comprising a head having a shoulder adapted to engage the top edge of said flange, a rack bar slidable through said head adapted to make endwise engagement with a surface fixed relative to said head, a shaft rotatable in said head, said shaft projecting normal to said rack, a pinion fixed on said shaft meshing with said rack, indicator means carried by said shaft adjacent the end thereof remote from said head, a tube surrounding said shaft and extending between said head and said indictor means, said tube being rotatably fixed relative to said shaft, said indicator means including a wheel circumferentially mounted on said shaft, a pointer rigidly mounted on said tube adjacent said wheel, means for adjusting said wheel circumferentially on said shaft, said adjusting means including a worm gear circumferentially mounted on said shaft for rotation therewith adjacent said wheel, a worm rotatably mounted on said wheel meshing with said worm gear, and means for fixing said worm against rotation whereby rotation of said shaft by said rack effects rotation of said wheel through said worm gear and said worm.

2. A gage for checking the height of the flange of a structural beam having a web, and a flange normal to said web, said flange having an edge distal from said web, which comprises a gage head having a planar bearing surface extending normal thereto, a rack bar slidably mounted in said head and extending normal to said bearing surface, one end of said rack bar normally projecting from said gage head, said projecting end of said rack bar being adapted to engage the web of said structural beam when said bearing surface is resting on the distal edge of said flange, said rack bar being adjustable in said gage head to a position wherein the distance from said bearing surface to the projecting end of said rack bar is substantially equal to a predetermined flange height, a shaft rotatably mounted by one end in said gage head and extending therefrom normal to said rack bar and parallel with the plane containing said bearing surface, a pinion fixedly mounted on said one end of said shaft meshing with said rack bar, a worn gear circumferentially mounted on said shaft remote from said one end for rotation therewith, a wheel rotatably mounted on said shaft adjacent said worm gear, a worm mounted for rotation on said wheel meshing with said worm gear, means for fixing said worm against rotation, a tube surrounding said shaft and extending between said gage head and said wheel, said tube being rotatably fixed relative to said shaft, indicia markings on the periphery of said wheel, and an indicating pointer for said indicia markings rigidly mounted on said tube.

References Cited by the Examiner
UNITED STATES PATENTS

| 1,082,714 | 12/1913 | Urban | 33—172 |
| 1,463,095 | 2/1920 | Rudnay | 33—169 |
| 2,303,858 | 12/1942 | Ostberg | 33—169 X |
| 2,462,566 | 2/1949 | Smith | 33—172 X |
| 2,835,041 | 5/1958 | Vogel | 33—172 |

ISAAC LISANN, *Primary Examiner.*